Feb. 2, 1926.
W. F. ROCKWELL
1,571,800
REAR AXLE ASSEMBLY
Filed Sept. 18, 1922
2 Sheets-Sheet 1
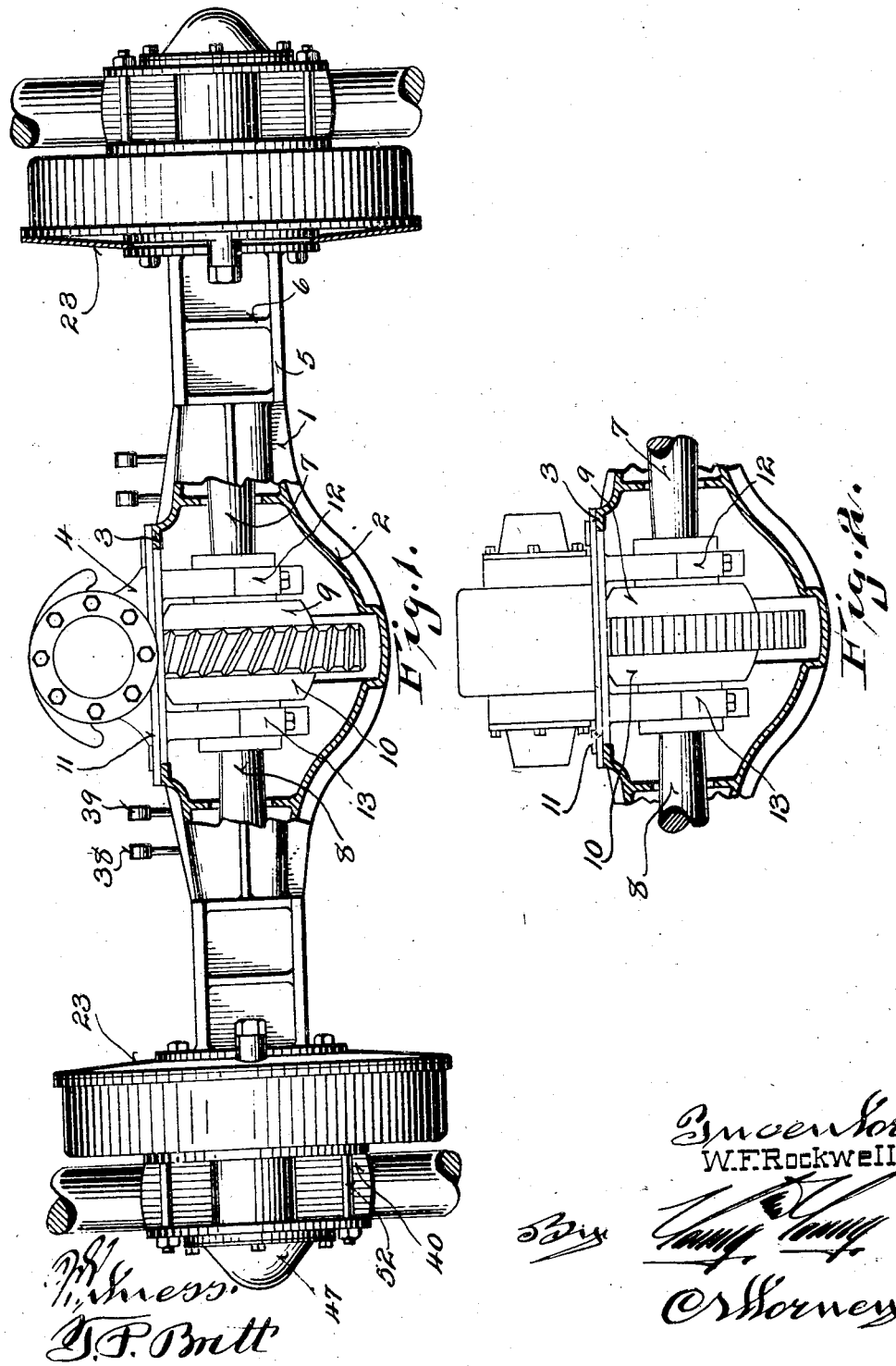

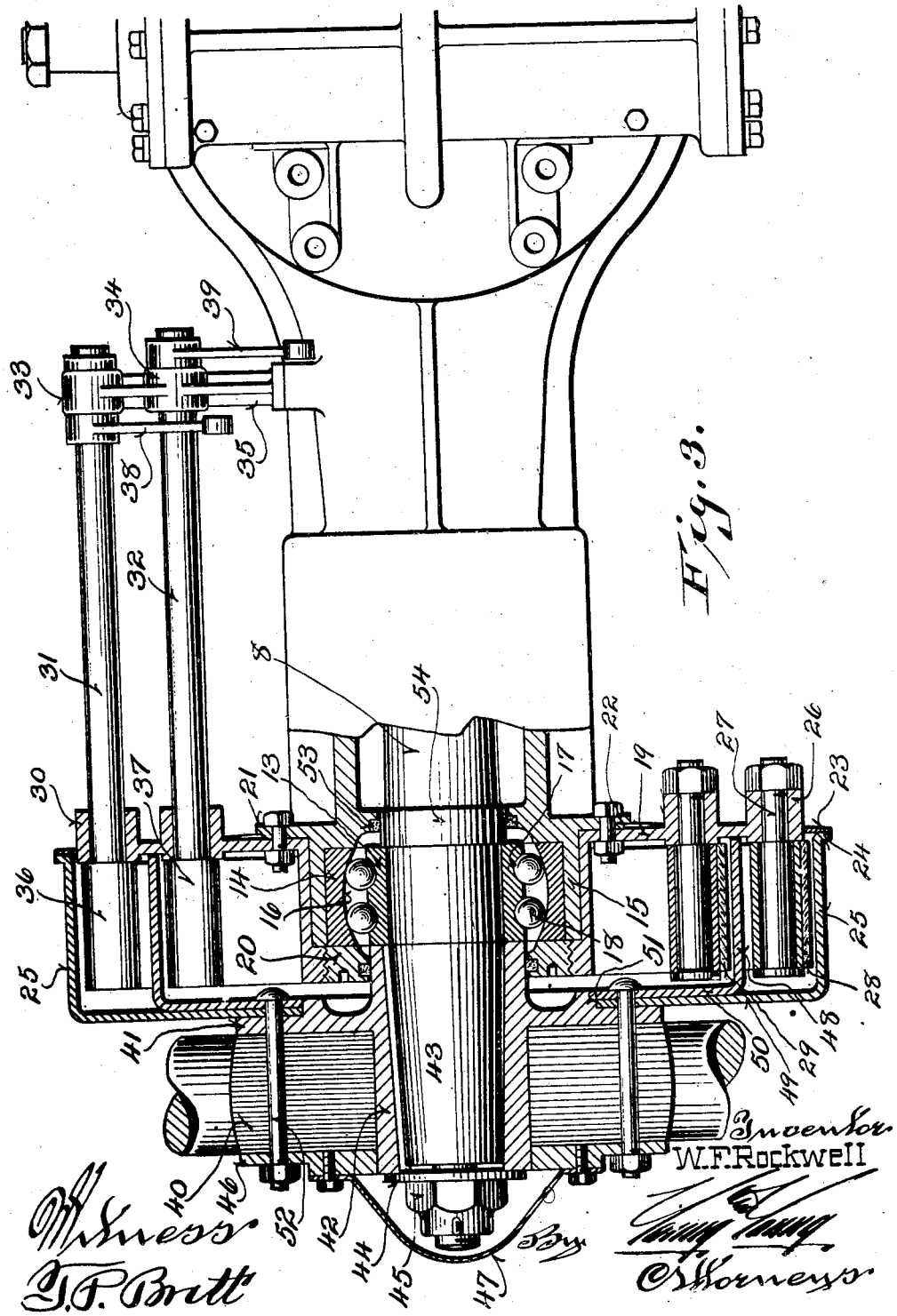

Patented Feb. 2, 1926.

1,571,800

UNITED STATES PATENT OFFICE.

WILLARD F. ROCKWELL, OF OSHKOSH, WISCONSIN.

REAR-AXLE ASSEMBLY.

Application filed September 18, 1922. Serial No. 588,926.

*To all whom it may concern:*

Be it known that I, WILLARD F. ROCKWELL, a citizen of the United States, and resident of Oshkosh, in the county of Winnebago and State of Wisconsin, have invented certain new and useful Improvements in Rear-Axle Assemblies; and I do hereby declare that the following is a full, clear, and exact description thereof.

This invention relates to rear axle assemblies for automobiles.

In automobile practice, it has heretofore been necessary to provide right and left hand parts for the rear axle assembly. Obviously, this necessitated right and left hand patterns, parts, jigs, tools, different machine methods for the same part, and a heavy expense in stocking up. The net result is a heavy overhead expense, not only for the manufacturer but also for the dealer, which is born eventually by the purchaser.

This invention is designed to overcome these undesirable features in automobile practice, and it therefore has for its object to provide a rear axle assembly in which the right and left hand parts are duplicates and may be freely interchanged, thus eliminating the unnecessary expenses resulting from the old practice.

Further object are to provide a rear axle assembly which has a one piece housing, semi-floating axles, dust and grit proof brakes.

Further objects are to provide rear axle brakes which are so constructed that the maximum heat dissipation is secured, which have two distinct concentric drums each of which is directly secured to the wheel hub and each of which is provided with an independent stationary cooperating member, so that the brake drums may be alternately used when coasting down a long hill as each drum is unaffected by the heat from the other brake, thus avoiding extreme rise of temperature even under the most severe conditions.

A further object is to provide a rear wheel assembly which permits the ready interchanging of several different speed reduction mechanisms, whereby the automobile may be readily changed to provide any one of several reduction ratios between the engine and rear wheels.

The term automobile is used throughout this application to designate any self propelled vehicle.

An embodiment of the invention is shown in the accompanying drawings, in which:

Figure 1, is a rear elevation of the rear wheel axle assembly of an automobile with parts broken away to more clearly illustrate the construction.

Figure 2, is a fragmentary view partly in section showing a different reduction mechanism associated with the rear wheel axle from that shown in Figure 1, and illustrates the interchangeability of such reduction mechanisms.

Figure 3, is an enlarged plan view partly in section of one end of the rear wheel axle assembly.

The rear axle housing 1, is an integral casting and is provided with an enlarged portion 2, having an open top portion provided with inwardly directed flanges 3 adapted to form a seat for the reduction mechanism 4. The housing is provided with longitudinal and transverse webs 5 and 6 respectively, to provide relatively great strength for the unitary housing. The rear axle is composed of two members or shafts 7 and 8, which are splined to the portions 9 and 10 of the differential mechanism of the reduction gear. The entire reduction mechanism is supported from the plate 11, of the reduction mechanism housing, and the differential members are carried by suitable hangers 12 and 13 which project downwardly from such plate. It is to be noted, therefore, that different reduction mechanisms having different gear ratios may be interchangeably positioned upon the rear axle housing, and that the shafts 7 and 8 may be readily fitted to any one of the several reduction mechanisms, and as an illustration, the worm drive reduction mechanism is shown in Figure 1, and a double reduction mechanism is shown in Figure 2.

The rear axles are semi-floating and are carried by ball-bearings located closely adjacent their outer end and within the outline of the wheel fellies. These ball-bearings are composed of an inner sleeve 13 seated upon the shaft and an outer race way 14 mounted within a bored extension 15 of the rear axle housing. This race way is provided with a spherical inner surface 16, to provide a self aligning bearing, and the sleeve 13 is provided with a pair of grooves 17 within which the hardened balls 18 are mounted. It will be seen, therefore, that if for any reason, as for example, lack of alignment or excessive loading, the axles should occupy an angular position, binding will not occur as the balls will merely assume a different position upon the inner spherical surface of the race way 14.

A brake anchor or bracket in the form of a disk 19 is mounted upon the outer turned extension 15 of the rear axle housing and is provided with a nut 20 adapted to retain the race way 14 in position. This brake anchor is bolted to outwardly projecting flanges 21 integral with the rear axle housing. A recess 22 is provided between flanges 21 and the disk 19 and may receive the inner portion of a dust guard ring 23, such ring extending to the outer edge of the upturned flange 24 of the outer brake drum 25. The brake anchor or disk 19 is provided with apertured bosses 26 within which anchoring pins 27 for the brake bands 28 and 29 are secured. At a substantially, diametrically opposite point, a second pair of apertured bosses 30 are for receiving the brake actuating rods 31 and 32, the inner ends of such rods being supported by bearings 33 and 34 formed in a bracket 35 and carried by the rear axle housing. The outer ends of the rods 31 and 32 are provided with cam members 36 and 37 for expanding the brake bands and the inner ends of the rods are provided with operating levers 38 and 39 adapted to be connected by suitable rods with the brake controlling devices.

The spokes 40 of the wheels are positioned against the flange 41 of a sleeve 42, such sleeve being taper bored and fitted upon the tapered portion 43 of the shaft, and is conveniently retained in place by means of a washer 44 and nut 45. An outer ring 46 bears against the outer sides of the spokes adjacent the hub portion of the wheel. It may carry a cap 47 if desired, such cap being of special formation to guard against inadvertent injury by contact with stumps, curbing, or other obstructions and to freely slide from such obstructions. It is to be noted that the cap is removably mounted so that a wheel pulling drum may be substituted, therefore, if desired.

An outer brake drum 25 and an inner brake drum 48 are provided and are concentrically mounted about the axis of the shaft or axle. These drums are respectively provided with inwardly directed independent webs 49 and 50, which are seated upon a turned surface or shoulder 51 of the flange 41. Bolts 52 are passed thru these members, thru flange 41, the spokes 40 and the outer ring 46, thereby rigidly clamping the wheels to the brake drums.

Provision is made for retaining the grease in the ball-bearing space and preventing such grease from mixing with the oil or grease in the rear axle housing, as for example, by means of the pair of washers 53 bearing upon the enlarged portion 54 of the shaft and the sleeve 42, such enlarged portion, it is to be noted, also cooperates with the sleeve 42 to retain the inner sleeve 14 of the ball-bearing mechanism in position. It is, however, to be noted that any oil or grease that inadvertently escapes will be caught by the inner brake drum 48, and will be prevented from reaching the outer brake drum thereby insuring the maximum efficiency, of one at least of the brake elements even in unusual conditions.

It will be seen that a rear axle assembly has been provided in which the identically formed right and left hand parts are provided, in which a one piece rear axle housing is employed, and in which the inner and outer brake drums, which may respectively be emergency and service brakes are rigidly and securely attached independently of each other, to the hub portion of the wheel.

It will further be seen that the brake drums are provided with maximum heat radiating surfaces, are prevented from accumulating dust and grit, and may be independently used.

It will further be seen that by the invention herein described, it is possible to readily interchange different reduction mechanism so that automobiles may be quickly adapted for any desired type of service. This is especially desirable as it permits the manufacturer to provide a standard rear axle housing which may cooperate with any desired type of reduction mechanism adapting the automobile for any desired service.

Although one specific embodiment of the invention has been described in considerable detail, it is intended that such invention shall be limited only as set forth in the appended claims and that the term automobile, as used in the specification is to be understood as defining any automotive device such, for instance, as a truck, tractor or pleasure car.

I claim:

1. An axle comprising a load carrying housing; a pair of wheel driving shafts supported in said housing; and differential drive mechanisms for said wheel driving shafts supported in gear housings interchangeably fitting said load carrying housing; one of said drive mechanisms comprising a worm driven differential reduction mechanism and another of said drive mechanisms comprising a spur gear driven differential reduction mechanism.

2. The axle as set forth in claim 1 in which said wheel driving shafts are interchangeable.

In testimony that I claim the foregoing I have hereunto set my hand at Oshkosh, in the county of Winnebago and State of Wisconsin.

WILLARD F. ROCKWELL.